Fig. 1.

INVENTORS
Clinton R. Hanna and
George R. Douglas.
BY Paul E. Friedemann
ATTORNEY

Patented Aug. 10, 1954

2,686,022

UNITED STATES PATENT OFFICE 2,686,022

GYROSCOPE CONTROL SYSTEM AND APPARATUS FOR CONTROLLING DIRIGIBLE CRAFT

Clinton R. Hanna, Claridge Place, and George R. Douglas, Pittsburgh, Pa., assignors to Westinghouse Electric Corporation, East Pittsburgh, Pa., a corporation of Pennsylvania Application November 14, 1947, Serial No. 785,986

35 Claims. (Cl. 244—77)

This invention relates generally to control apparatus and more in particular to control apparatus applicable in the control of conveyances operable in space.

The present invention is herein illustrated and described as applied in the control of a conventional aircraft utilizing rudders, elevators and ailerons, respectively, for controlling the craft directionally, longitudinally and laterally about the turn, pitch and roll axes thereof. However, it will be appreciated that the control apparatus herein disclosed may be applied to other types of craft utilizing means other than the control surfaces mentioned for effecting maneuverability.

In certain of its aspects this invention is related to the patent of S. J. Mikina, No. 2,491,998, issued on an application filed February 19, 1944, entitled Fluid Flow Indicator, and assigned to the same assignee as this invention.

In certain other of its aspects this invention is related to the patent of C. R. Hanna, No. 2,638,288, issued on May 12, 1953 on an application filed on the same date as this application, entitled Control Systems and assigned to the same assignee as this invention.

The mentioned C. R. Hanna patent is directed to an automatic pilot for aircraft which is controlled by three velocity responsive type gyroscopes, each of which is disposed on the aircraft to respond to rates of motion of the craft about one of its three principal control axes, so that each of the rudders, ailerons and elevators of the craft are controlled in dependence of velocity errors about the corresponding control axis. Additionally the control sections of the system for each of the rudders, ailerons, and elevators are so interrelated as to afford coordination of control surface movement for the purpose of maintaining the craft in equilibrium in various attitudes of flight and the entire system is under the control of a suitable piloting means manipulatable by the human pilot.

Velocity type gyroscopes are inherently highly sensitive and, hence, respond to very low angular rates of motion of the craft about its control axes, producing a control which anticipates impending position changes and minimizes excursions of the craft in unwanted directions. But the velocity type gyroscope in itself is insensitive to position errors and, although these gyroscopes have a very low threshold of response to velocity errors, and position errors as a rule accumulate only over relatively long periods of time, it is usually desirable that a control of this type shall have a position sense affording corrections also in dependence of angular errors in position.

To this end in the above mentioned control of the identified C. R. Hanna patent, suitable means are provided to impart directivity to the velocity type gyroscopes affording position references for these gyroscopes in yaw, roll and pitch of the craft and it is to a particular means imparting a rate and/or a position sense vertically in such a system of control that the present invention is directed.

One object of this invention is to provide a system of control for a body operable in space which is simple with respect to operational requirements and positive in operation.

Another object of this invention is to provide a system of control for a body operable in space affording a control of the body in a vertical plane in dependence of the vertical rate of motion of the body and/or position with respect to a given reference position.

More specifically stated, it is an object of this invention to provide a control for a body operable in space in which the vertical motion of the body is controlled as a function of a rate of change of air pressure and/or a change of air pressure.

In connection with the preceding object, it is also an object of this invention to provide a device responsive to rates of change of pressure of a fluid medium and/or changes in pressure of a fluid medium.

The foregoing statements are illustrative of the various aims and objects of this invention. Other objects and advantages will become apparent upon a study of the following specification when considered in conjunction with the accompanying drawings, in which:

Figure 1:
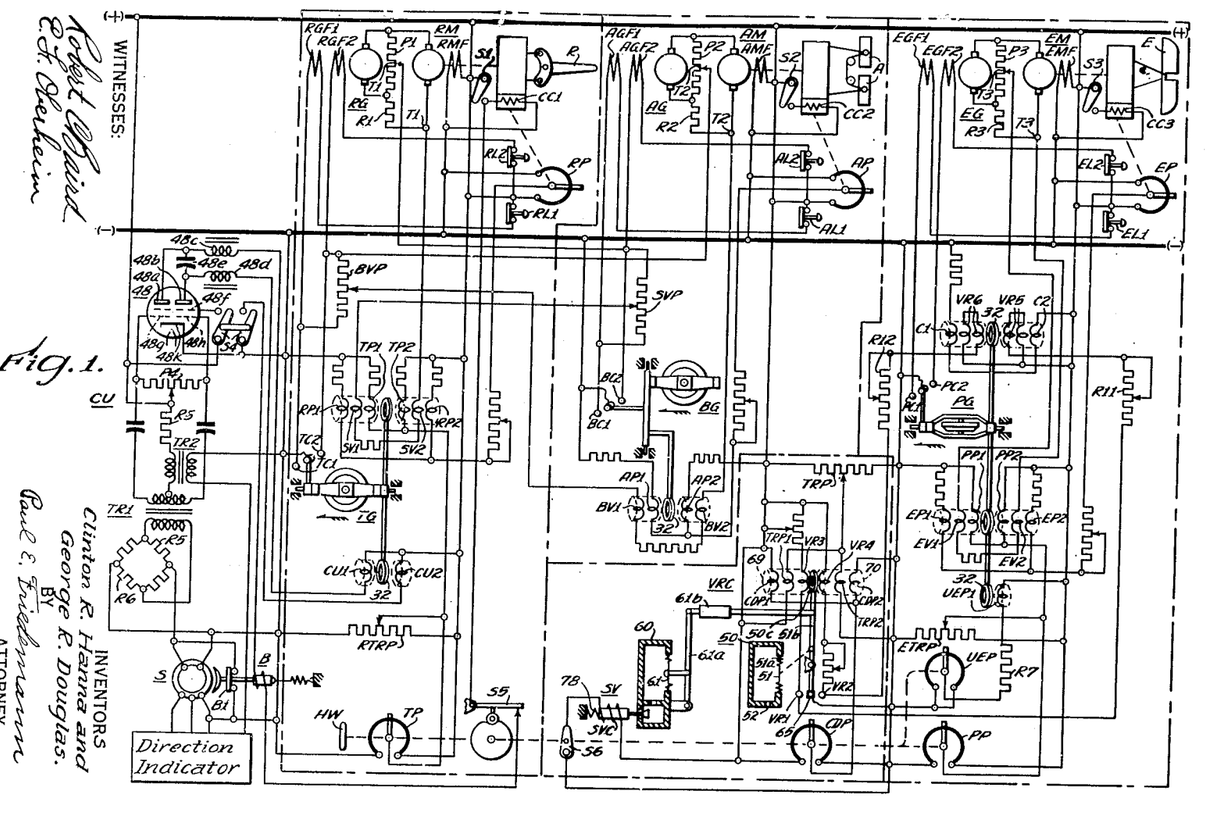
Figure 1 is a schematic diagram of a control system embodying the principles of this invention.

The system illustrated in Fig. 1 embodies the rate or velocity type gyroscopes previously mentioned. One, a turn rate gyroscope TG, controls a servo system including the rudder generator RG and the rudder motor RM which drives the rudder R of the aircraft. The second, a bank or roll rate gyroscope BG, controls a servo system including the aileron generator AG and aileron motor AM which drives the ailerons A, and the third, a pitch rate gyroscope PG, controls a servo system including the elevator generator EG and the elevator motor EM which drives the elevators E. Each gyroscope is oriented in the aircraft to respond to the rate of motion thereof about the corresponding control axis, the direction of flight being indicated by the arrow adjacent each gyroscope and the gyroscopes appearing as viewed from the side of the aircraft, that is, in elevation. Details of these gyroscopes may be found in the mentioned C. R. Hanna patent, only sufficient discussion of the gyroscope being incorporated in the disclosure here presented for an understanding of the present invention.

As illustrated, each gyroscope has freedom for gyroscopic response about a single axis, otherwise each gyroscope is secured to the aircraft to move therewith. Thus it will be observed that the turn gyroscope is sensitive only to angular motion about the turn axis of the aircraft, the turn axis lying in the plane of the drawing and being perpendicular to the axis about which the turn gyroscope is pivoted, which pivot axis constitutes the output or precession axis of the turn gyroscope. The pitch gyroscope PG is similarly disposed, its output or precession axis being perpendicular to the pitch axis of the aircraft, which is a line perpendicular to the plane of the drawing. The same applies to the bank gyroscope BG having its axis of freedom disposed at right angles with the roll or bank axis of the aircraft, which axis is a horizontal line paralleling the plane of the drawing. In each case it will be observed that a rate of motion of the aircraft about any one of the turn, roll or pitch axes applies a torque to the corresponding rate gyroscope tending to angularly displace the spin axis thereof. Accordingly, each gyroscope, having a degree of freedom about an output axis at right angles to the axis of the applied torque, produces an output torque representative of the input velocity, and the output torque is herein utilized to produce suitable control quantities for operating the associated servo system.

There are several ways in which the gyroscope output torques may be utilized to produce electrical quantities. For instance, the torque may be applied through a mechanical linkage to a carbon pile unit or other type of variable resistance unit to control the resistance thereof.

Such an arrangement is illustrated in a co-pending application of C. R. Hanna and K. A. Oplinger, Serial No. 785,985, filed on the same date as this application, entitled Control Systems and assigned to the same assignee as this invention. This application is now Patent No. 2,656,134. The present embodiment utilizes a contact set comprising a pair of opposed stationary contacts having a movable contact secured to the gyroscope radially of the output axis thereof, disposed therebetween. Thus in the case of the turn gyroscope precessional motion selectively engages the movable contact with either of contacts TC1 or TC2 which are, respectively, connected in series with one of a pair of differentially related field windings RGF1 and RGF2 on the rudder generator RG. The circuit for the field RGF1 extends from the positive conductor (+) through limit switch RL1 controlled by the rudder potentiometer RP, through the field RGF1 to contact TC1 and thence to the movable contact and the negative conductor (−). Similarly the circuit for field RGF2 extends from the positive conductor (+) through limit switch RL2 actuated by the rudder potentiometer RP, through field RGF2 to contact TC2 and thence to the movable contact and the negative conductor (−). The bank and pitch gyroscope contact circuits are the same as that of the turn gyroscope, aileron generator field AGF1 being connected in series with limit switch AL1 actuated by the aileron potentiometer AP and bank contact set BC1 across the power supply and field AGF2 being connected in series with limit switch AL2 and bank contact set BC2 across the power supply. Similarly elevator generator field EGF1 is connected in series with limit switch EL1 actuated by elevator potentiometer EP and the pitch contact set PC1 and field EGF2 is in series with limit switch EL2 and pitch contact set PC2 both series circuits being connected across the power supply.

The function of the gyroscope contacts in controlling the excitation of the field circuits of the generators is not simply that of making and breaking the circuit to the selected field but also that of controlling the current magnitudes in these circuits. This is accomplished by controlling the contacts so that hovering operation obtains in dependence of gyroscope output torques, suitable electromagnetic biases about the output axis of each gyroscope, and a degree of dynamic unbalance in the rotating system of the respective gyroscopes. By this means average currents are caused to flow in the field circuits corresponding to the detected error velocity about the corresponding control axis of the aircraft or corresponding to a set in turn rate at the handwheel HW.

The mentioned electromagnet biases are produced by sets of electromagnets having armatures secured to the respective gyroscopes radially of their output axes. The specific structure of the electromagnets is not illustrated but reference may be had to the mentioned C. R. Hanna Patent No. 2,638,288, for these details. Generally, the electromagnets are designed with overlapping core and armatures so that appreciable changes in airgaps with armature movement do not occur over the limited range of armature motion so that the magnet force is independent of the armature position with respect to the magnet core, minimizing negative stiffness. Each magnet comprises a cylindrical core (not shown) having one extremity thereof projecting beyond the coil or coils wound thereabout. In the magnet systems shown in the drawings, the cores are disposed in opposed relation and an annulus 32 of magnetic material secured to the associated gyroscope as previously described surrounds the core structures at the airgap formed between the confronting extremities of the cores. The axial length of each armature is sufficient that overlapping of the cores thereby exists throughout the limited range of armature motion.

The electromagnetic biases are produced by feed back voltages and control voltages applied to the respective coils of the magnets. The precessional response of each gyroscope is damped by a feed back voltage representative of the velocity of operation of the motor of the corresponding servo system. To this end each motor is connected as one leg in a bridge circuit which is balanced against the IR drop of the motor armature. Thus when the motors drive the corresponding control surfaces to equilibrium position and stop the currents circulating in the bridge circuits are balanced and the output voltage of each bridge is zero. However, during rotation the back emf of the respective motors increases the apparent armature resistance unbalancing the bridge circuit and producing an output voltage. Inasmuch as the motor fields RMF, AMF and EMF for the rudder motor, the aileron motor and the elevator motor are maintained at constant voltage across the power supply, the back emf varies in magnitude and direction with the motor speed and direction of rotation producing a velocity voltage across the output terminals of each bridge circuit. The bridge circuit for the rudder motor includes a potentiometer P1 of which the tapped portions form adjacent legs and the remaining adjacent legs are formed by the resistor R1 and the armature winding of the rudder motor. Generator RG is connected across potentiometer P1 the extremities of which form the bridge circuit input terminals while terminals T1 formed by the tap of potentiometer P1 and the point between resistor R1 and the motor armature winding are the output terminals. The armature winding of aileron motor AM likewise forms one leg of a bridge circuit energized by generator AG and including a potentiometer P2 and a resistor R2 the output terminals being designated T2. Similarly the armature winding of the elevator motor EM forms one leg of the bridge including potentiometer P3 and resistor R3 which is energized by generator EG and has for its output terminals the terminals T3. In each instance the velocity voltage taken from the respective bridge circuits is fed back in a negative sense, that is the electromagnetic bias resulting from the velocity feed back voltage opposes the precessional response of the corresponding gyroscope.

A second feed back voltage for each of the turn, bank and pitch gyroscopes is taken from the potentiometers RP, AP and EP, respectively, the movable taps of each of which are driven by the corresponding servo system through electromagnetically operated clutches having coils CC1, CC2 and CC3 which are respectively energized from the power supply upon closure of switches S1, S2 and S3. Since the potentiometers are each actuated by a motor driving a control surface of the aircraft the position of each movable tap and hence the tapped voltage corresponds to the position of the associated control surface thus the response of each gyroscope is also controlled in dependence of control surface position.

In order to obtain coordination of control surface movement during the execution of turns, the turn and bank gyroscopes TG and BG are additionally biased by voltages taken, respectively, from a skid voltage potentiometer SVP and a bank voltage potentiometer BVP, which are respectively connected in the field circuits of the aileron and rudder generators to be energized in dependence of the currents circulating therein when a set of the associated gyroscope's contacts are closed. For instance, regarding the skid voltage potentiometer SVP, when the contact BC1 is engaged by the movable contact actuated by gyroscope BG to energize field AGF1, a circuit for energizing skid voltage potentiometer SVP is completed beginning with the positive conductor (+) and including limit switch AL2, generator field AGF2, potentiometer SVP, contact BC1 and the movable contact engaged therewith to the negative conductor (−). Engagement of the movable contact with contact BC2 energizes the potentiometer SVP in a reverse direction in a circuit including the generator field AGF1 and limit switch AL1. Analogous considerations apply to the bank voltage potentiometer BVP. Thus upon the operation of either of the bank or turn gyroscopes to control the associated control surface the other gyroscope is biased in a direction to effect coordinated application of its control surface.

The turn and pitch gyroscopes are additionally biased by voltages obtained from potentiometers controlled by handwheel HW under the control of the pilot. In the rudder section of the system the potentiometer is designated TP while in the elevator section the potentiometer is designated UEP. These potentiometers are controlled by rotational motion of the handwheel, the turn potentiometer TP producing voltages of reversed polarity upon motion of the movable tap from one side to the other of mid or neutral position while the up-elevator potentiometer UEP produces unidirectional voltages on either side of its midpoint position. Thus the biasing effect on the pitch gyroscope is unidirectional to produce up-elevator for either direction of rotation of the handwheel and bank of the aircraft which follows to compensate for the reduction in loss of horizontal lifting surface of the main wing during banking, by increasing the angle of attack thereof. Additionally it has been found that the required amount of up-elevator varies substantially as the square of the angle of bank. Thus by applying suitable biasing effects to the electromagnets of the turn and bank gyroscopes to obtain linear response, the application of a square law bias to the pitch gyroscope produces the required degree of up-elevator application for the turn rate set in at the handwheel. In the present instance, the square law bias is obtained by utilizing a potentiometer UEP in series with an unbiased electromagnet. Alternatively potentiometer UEP may form one leg of a bridge circuit and be of sufficiently high ohmic resistance with respect to the resistance of the coils occupying positions in adjacent legs of the bridge that a flat response over the middle or neutral range of the potentiometer obtains producing coil biasing voltages approximating a square law.

The pitch rate gyroscope is also biased by voltages taken from the pitch potentiometer PP. This potentiometer is actuated by push-pull motion of the handwheel HW affording reversed polarity biasing voltages when the movable tap is moved to opposite sides of neutral position, dives and climbs being executed by push-pull motion of the handwheel.

The mechanics of the handwheel and potentiometer assembly whereby potentiometers TP and UEP are actuated by handwheel rotation and potentiometer PP and its companion potentiometer CDP of the vertical rate control are actuated by push-pull motion of the handwheel have not been illustrated in the interest of simplicity. Suitable expedients for accomplishing such a function are believed well known to the art.

Directivity is imparted to all three gyroscopes. In the case of the bank gyroscope this is accomplished by making the gyroscope pendulous about its vertical output axis as illustrated. Thus this gyroscope in addition to responding to rates of motion about the roll axis is also sensitive to lateral acceleration and gravity, tending to assume a position about the output axis thereof corresponding to the resultant of these two quantities. As a consequence the reference position for which the bank gyroscope initiates rolling motion of the aircraft, corresponds to the proper angle of bank for the actual turn velocity of the craft.

In the case of the turn rate gyroscope TG directivity is obtained from the course control unit generally designated CU. Means for producing the fixed course voltages may be of any suitable form. One such means includes a gyro stabilized magnetic compass (not illustrated) embodied in the block entitled Direction Indicator. This type of device includes a magnetic pickup commonly known as a flux valve. Briefly such a compass comprises three stationary magnetic members disposed at 120° in a horizontal plane so that their permeability is altered by the horizontal component of the earth's magnetic field. When the three members are excited by a single phase alternating current, there is produced in three secondary windings forming part of the magnetic members a set of voltages having double the applied frequency which are unbalanced in magnitude depending upon the direction of the earth's magnetic field. Such voltages correspond in every respect to single phase synchro transmitter voltages as the rotor of the synchro transmitter is turned. The voltage pattern of the flux valve is applied to the stator of a single phase synchro control transformer the single phase output of which is amplified and employed to bias the directional gyroscope which in the instant application is of the position type. The bias forces acting about the input axis of the directional gyroscope produce precession movement thereof which by suitable mechanical connection with the rotor of a second synchro control transformer effects rotational movement thereof producing a strong output voltage pattern. This output voltage pattern is applied to the stator of a synchro unit S connected in a suitable network whereby a control of the tube 48 is had.

Vacuum tube 48 is provided with a pair of plates connected with the positive side of the source. The circuit for plate 48a including choke coil 48c and coil CU2 and the circuit for plate 48b including choke coil 48d and coil CU1. Choke coils 48c and 48d together with the shunt connected capacitor 48e form a filter network for the plate circuit tending to provide vibrationless electro-magnet control for the turn gyroscope. Suppressor grid 48f is connected to the positive side of the supply source through one blade of switch S4. Control grids 48g and 48h are connected to diagonally opposite terminals of a bridge network including a potentiometer P4 and the secondary winding of a transformer TR1 in such a way that the voltages thereof are varied in opposite directions depending upon the voltage across the secondary winding of transformer TR1. The cathode 48k is connected to the negative side of the source, completing the power circuit for the tube.

A circuit including the secondary winding of transformer TR2 and series resistor R5 is connected across the remaining two terminals of the bridge network formed by a tap on the secondary winding of transformer TR1 and the adjustable tap of potentiometer P4. A constant bias is applied to the control grids 48g and 48h by the connection of the tap of potentiometer P4 to the positive side of the source, the adjustment being such as to balance the plate currents of the tubes when the error signal is zero. A reference voltage having a frequency synchronized with the frequency of the voltage of the rotor winding of synchro unit S is applied to the primary winding of transformer TR2 enabling phase recognition of the error voltage when compared with the reference voltage in the bridge network.

The output side of the synchro unit S is connected across a normally unbalanced resistance bridge network including a pair of resistors each designated R6 in opposite legs. Resistors R6 are of equal ohmic values higher than the ohmic values of the resistors in the remaining two legs, unbalancing the bridge. Additionally resistors R6 are of material in which the resistance decreases as the applied voltage increases. Hence, as the applied voltage to the bridge is increased the decreasing resistance of resistors R6 tends to decrease bridge unbalance. With this arrangement it is possible to increase the sensitivity of the amplifier to small error voltages and since the bridge unbalance is reduced by large error voltages, the range of voltages applied to the amplifier is not excessive.

The instantaneous phase relation of the error signal with respect to the reference voltages on the grid circuit of the tube 48 depends upon the direction of angular displacement of the aircraft with respect to the set course, and drives one grid more positive as the other is made less positive in a degree depending upon the amplitude of the error signal, with respect to the reference signal. This pushpull operation of tube 48 unbalances the voltages of the two plates producing the course error voltage. The course error voltage is removed from the system during turns of the craft initiated by handwheel HW and the synchro unit S functions as a repeater. To this end a brake B spring biased to released position is provided. In released position brake B closed contacts B1 which close the rotor winding circuit of unit S, shunting the amplifier from the circuit. The circuit for brake B across the supply includes switch S4 and cam-operated switch S5 actuated by the handwheel. When the switches are closed the brake is applied locking the rotor. Motion of the handwheel HW opens S5 to unlock the rotor and close the rotor winding circuit. Further details of the course control unit herein described may be found in a copending application of I. M. Holliday, G. R. Douglas and C. R. Hanna, Serial No. 785,984, filed on the same date as this application, now Patent No. 2,656,134, entitled Control System and assigned to the same assignee as this invention. This application is now Patent No. 2,663,838.

In the case of the pitch rate gyroscope directivity is obtained from the vertical rate control unit VRC which will be described in detail hereinafter. This unit produces biasing voltages in dependence of the rate of change of altitude and/or a change of altitude.

Summing up the foregoing electromagnetic biases on the individual gyroscopes, the turn rate gyroscope electromagnet assembly is controlled by a rudder motor velocity voltage, a rudder position voltage, a skid voltage, a piloting voltage from the turn potentiometer and a course error voltage.

The bank rate gyroscope electromagnet assembly is controlled by an aileron motor velocity voltage, an aileron position voltage and a bank voltage.

The pitch rate gyroscope electromagnet assembly is controlled by an elevator motor velocity voltage, an elevator position voltage, a piloting voltage from the up-elevator potentiometer UEP, a piloting voltage from the pitch potentiometer PP and a combined vertical rate and vertical position voltage from the vertical rate control unit VRC.

These biasing voltages for the three gyroscopes are applied in any suitable operating sequence and in various magnitudes depending upon the control requirements of the specific operating condition and the circuit connections are as follows:

Considering the turn gyroscope electromagnet system, the velocity feed back voltage taken from terminals T1 and the skid voltage taken from potentiometer SVP are added in series in a circuit extending from terminal T1 at the movable tap of potentiometer P1, through a portion of the skid voltage potentiometer SVP to the tap thereof through coils SV1 and SV2 to the other terminal T1 these voltages produce opposed torques about the gyroscope output axis. The rudder position feedback voltage is applied by the connection of the rudder potentiometer RP in a bridge circuit with coils RP1 and RP2 so that movement of the tap of the rudder potentiometer unbalances the coil currents. The piloting voltage is applied by connecting the turn potentiometer in a bridge circuit with coils TP1 and TP2 similar to the rudder potentiometer and means for trimming this circuit for off balance conditions is had in the rudder trim potentiometer RTRP, the movable tap of which adjusts the currents in coils TP1 and TP2 when potentiometer TP is centered to compensate for off center conditions. The course error voltage is applied to coils CU1 and SU2 which produce balanced torques when the craft is on course. While the magnetic effects of coils SV1 and SV2 produce opposed torques about the gyroscope axis due to the fact that they are arranged on oppositely disposed cores, for a given control condition the mmf of one of these coils always opposes that of one of the coils RP1 or RP2 because the mmf's of coils RP1 and RP2 are opposed. Thus the polarizing effect of such coils as RP1 and RP2 is such as to effect an unbalance of magnet forces and, hence, an unbalance of torques about the turn gyroscope output axis due to the velocity feed back voltage.

In the bank rate gyroscope electromagnet system, the velocity voltage and the bank voltage taken respectively from the pair of bridge circuit terminals T2 and the bank voltage potentiometer BVP are added in series in a circuit including a pair of coils BV1 and BV2. This circuit corresponds to its counterpart in the rudder section of the system. The aileron position voltage is applied by the connection of the aileron potentiometer AP in a bridge circuit with coils AP1 and AP2 in which the movable tap on AP unbalances the coil currents. The mmf's of the two pair of coils are related as those of the coils SV1, SV2 and RP1, RP2.

In the pitch gyroscope electromagnet system the velocity voltage is applied to coils EV1 and EV2 which are connected in series across the terminals T3 of the elevator motor bridge circuit and the elevator position voltage taken from potentiometer EP is applied by means of a bridge circuit in which the tapped portions of potentiometer EP form adjacent legs and a pair of coils EP1 and EP2 form the remaining two adjacent legs, the movable tap of potentiometer EP being connected between the coils EP1 and EP2 to control the current distribution between the coils. Here again the mmf's of the coils EV1 and EV2 are in the same direction while the mmf's of the coils EP1 and EP2 are opposed. Thus for one polarity of terminals T3 the mmf of coil EV2, for instance opposes that of coil EP2 while the mmf of coil EV1 aids that of coil EP1. When the velocity voltage is reversed and the polarity of terminals T3 is reversed, the mmf of coil EV1 opposes that of coil EP1 while that of coil EV2 aids that of coil EP2. The piloting voltage of the up-elevator potentiometer UEP controls coil UEP1 connected in series therewith. In this circuit the up-elevator potentiometer has its extremities connected together to form a common terminal. Thus the tapped portions of the potentiometer form parallel resistance branches in the series circuit in which movement of the movable tap to either side of center position decreases the resistance of the circuit. Inasmuch as the coil UEP1 is on a separate coil and is unbiased by other of the coils, the response of the magnet to coil current obeys the square law and affords the desired up-elevator application. The piloting voltage from the pitch potentiometer PP is applied by means of a bridge circuit including the tapped portions of pitch potentiometer PP as adjacent legs and the pair of coils PP1 and PP2 as the remaining adjacent legs, the movable tap of potentiometer PP being connected between the coils PP1 and PP2 controls the current distribution in these coils. The elevator trim potentiometer ETRP parallels potentiometer PP and the movable tap thereof controls the current distribution of coils PP1 and PP2 to correct for off center conditions. The vertical rate and vertical position quantity of the vertical rate control VRC is applied to coils VR5 and VR6. These coils are respectively connected in series with contacts VR1 and VR2 of the vertical rate control and one coil or the other is energized depending upon which of contacts VR1 and VR2 is engaged by the movable contact associated therewith. Since a linear response is here desired a pair of biasing coils C1 and C2 are applied to the cores carrying the coils VR5 and VR6 coil C1 being on a core with coil VR5 and coil C2 being on a core with coil VR6. Coils C1 and C2 are arranged in series in a circuit across the power supply and produce opposed magnetic forces. The magnetic biasing effect of these coils with respect to coils VR5 and VR6 is such as to produce a linear magnet response to the current of coils VR5 and VR6.

Thus it will be observed that the hovering operation of the contacts controlled by the gyroscopes as hereinbefore noted is influenced in each case by a multiplicity of electromagnetic biases which operate in varying degree and at various intervals to produce the required biasing effect on the gyroscopes of the system and if desired contact hovering may be augmented by introducing torsional vibration about the output axis of each gyroscope by introducing a degree of dynamic unbalance in the rotor system of each.

Figure 2:
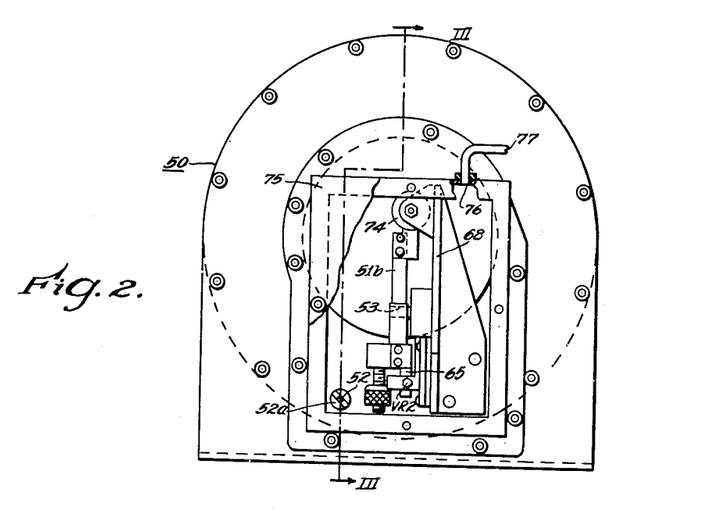
Fig. 2 is a front elevational view of the vertical rate control unit embodied in Fig. 1.
Figure 3:
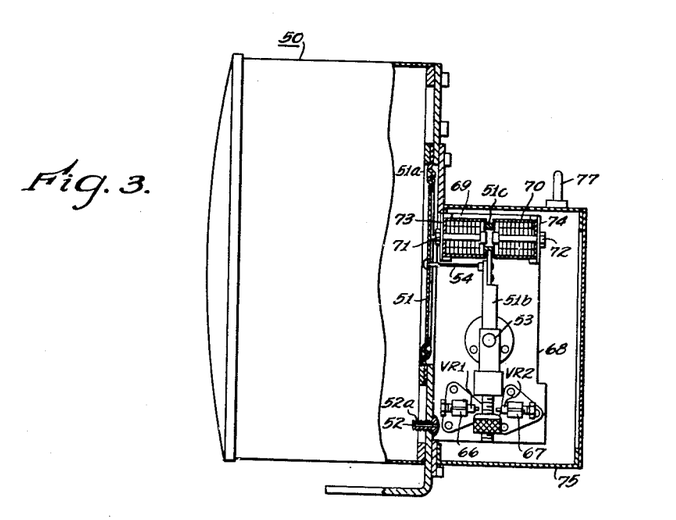
Fig. 3 is a side view partly in section of Fig. 2.

The vertical rate control unit VRC which controls the energization of coils VR5 and VR6 of the pitch rate gyroscope is detailed in part in Figs. 2 and 3. In the copending application of C. R. Hanna hereinbefore identified reference is made to a pendulum controlled potentiometer regulator for providing a position reference for the pitch rate gyroscope. The pendulum of the assembly therein illustrated is mounted in the gyroscope unit about an axis paralleling the pitch axis of the craft and therefore affords a measure of angular motion of the craft about the pitch axis. Inasmuch as the vertical rate of the craft in a sense is a function of the pitch angle a pendulous member if unaffected by longitudinal acceleration could provide a suitable vertical rate control. However, once the craft has been trimmed for a given pitch attitude any change in pitch attitude produces longitudinal acceleration. For instance, should the nose of the craft drop the longitudinal acceleration is directed forwardly and should the nose rise the longitudinal acceleration is directed rearwardly. The forces due to the acceleration acting on the pendulum oppose the gravitational component which would cause the pendulum to feel the tilt. Thus the position of the pendulum with respect to the craft is not an accurate indication of pitch attitude until the longitudinal acceleration becomes zero introducing a time delay in the detection of changes in pitch attitude tending to cause hunting.

A free vertical gyroscope might be employed as a vertical reference but, if pendulous, would also be subject to longitudinal acceleration and in addition has the disadvantage of not having unlimited angular freedom, limiting the maneuverability of the aircraft. Fundamentally the problem is to maintain constant altitude and it would be only a substitute remedy to maintain the angular position of the aircraft constant relative to the vertical, since the angle of attack must vary with load and power changes.

It is a better solution, therefore, to regulate the direction of motion in the pitch plane to maintain a relatively fixed altitude of flight than to control the angular position of the craft in the pitch plane. In the present case this is accomplished by utilizing a device which senses the vertical component of the forward velocity of the aircraft by detecting the rate of change of air pressure. Using the device hereinafter disclosed as a reference in the control of the pitch rate gyroscope the pitch regulator or elevator control system can maintain constant altitude or a fixed rate of climb or dive.

The vertical rate control comprises an enclosure or casing 50 of sheet material having an opening therein which is sealed by a flexible diaphragm assembly. The diaphragm assembly includes a metal plate 51 having a flexible annulus 51a secured about its periphery. This assembly seals the opening in the enclosure 50 by suitable securing of the outer peripheral edge of the flexible annulus 51a to the enclosure surface adjacent the opening. A screw 52a having a hole 52 therethrough is threaded through a section of the enclosure 50 adjacent the flexible diaphragm assembly and forms an orifice for restricted passage of air to and from the chamber within the enclosure 50.

Motion of the plate 51 of the diaphragm assembly is transmitted to an arm 51b pivotally mounted at 53 through the medium of a push rod 54 connected to the plate 51 and a point on the arm displaced from the point of pivoting thereof. Arm 51b at its lower extremity carries a movable contact 65 disposed between a set of contacts VR1 and VR2 which are threadedly supported in members 66 and 67, respectively, secured to a mounting plate 68 attached to the diaphragm side of enclosure 50. The contact clearances need only be of the order of a few thousandths of an inch. Thus each contact set is closed with a force depending upon the unbalanced pressure forces acting upon the diaphragm assembly.

The upper end of arm 51b carries an armature 51c of the form of a ring, which forms part of an electromagnet assembly. This electromagnet assembly includes a pair of oppositely disposed magnetic members 69 and 70 having cores 71 and 72 coaxially disposed in confronting relation so that the confronting extremities of the cores are spaced by an airgap. Coil assemblies 73 and 74 which surround the cores 71 and 72, respectively, are of shorter axial length than the cores and armature 51c encircles the projecting extremities of the cores at the airgap forming an overlapping gap magnet construction in which the airgap dimensions are relatively constant throughout the range of armature movement. This construction provides magnetic forces on the armature which are relatively unaffected by armature position, minimizing negative stiffness. This magnet assembly is similar to that of the gyroscopes. In Fig. 3 no effort is made to identify the various coils on the magnetic members 69 and 70, inasmuch as these coils are shown in Fig. 1. The magnet and contact assembly is disposed within a housing 75 having an opening 76 therein connected with the static line 77 and the atmosphere externally of the cabin of the aircraft. This in most cases is a necessary expedient since the pressure within the cabin frequently differs from that without.

In view of the function of orifice 52 permitting air to flow in a restricted manner between the chamber with which it communicates and the outside air, when the outside air pressure is not changing the pressure within and without the chamber equalizes across the orifice and the force on the diaphragm assembly is zero. If the outside air pressure is changing, that is, if the aircraft is ascending or descending, the orifice restricts the flow of air and maintains a pressure differential between the air in the chamber and the outside air proportional to the vertical rate of the craft. Thus the force on the diaphragm assembly, after a short time delay, is proportional to the vertical rate of motion of the craft and is employed through the contact assembly to control the pitch rate gyroscope so as to maintain a relatively constant altitude of flight or a fixed rate of climb or dive.

For precise control of altitude a second pressure sensitive device may be employed. Such a device may be similar to that just described but constructed to respond to air pressure changes rather than rates of change of air pressure. In accomplishing this the orifice 52 is sealed and a biasing means of adjustable force type applied to the flexible diaphragm assembly to match the steady pressure within the chamber. An adjustable spring bias represents one method of applying the biasing force to the diaphragm. Thus by varying the spring loading the effective diaphragm force may be varied to correspond to various levels of flight. A more convenient arrangement, however, is to have a magnet operated valve in communication with the sealed chamber which is opened when the craft is ascending or descending. When the craft is at the desired altitude of flight the valve is then closed sealing the chamber and trapping air therewithin at a pressure corresponding to that at the altitude at which the magnet or solenoid type of valve is closed. If the pressure responsive diaphragm controls a set of contacts similar to those of device 50, the output of the contacts of the fixed altitude control may be applied directly to coils of the pitch rate gyroscope or may be applied to coils of the magnetic members 69 and 70 of the vertical rate device which, in turn, biases the pitch rate gyroscope.

Alternatively the forces of the two diaphragm assemblies may be added at one contact assembly and magnet system. Proper proportioning requires that the fixed altitude diaphragm be smaller than that on the rate sensitive unit and as a consequence such an assembly would be little larger than the vertical rate unit alone. It is desirable in this case to connect the fixed altitude diaphragm to the pivoted arm 51b of the vertical rate device through a loaded spring in order to limit the maximum possible force on the arm 51b to some reasonable value.

This latter arrangement is shown in Fig. 1 in which an enclosure 60 having an opening therein sealed by a flexible diaphragm assembly including a plate 61 and flexible annulus as in the vertical rate device constitutes the fixed altitude chamber. Plate 61 is connected by a link system 61a including a loaded spring assembly 61b to the pivoted arm 51b of the vertical rate device. The loaded spring assembly is not detailed since numerous mechanical devices of this type are well known to the art and the structural details thereof are unimportant to an understanding of this invention.

The chamber formed by enclosure 60 is opened and closed by means of the solenoid valve SV biased by a spring 76 to open position and closed magnetically upon energization of coil SV1 which is connected in series with a switch S6 across the positive (+) and negative (−) conductors. Switch S6 is operated to open position by push-pull motion of the handwheel HW. Hence, coil SV1 is deenergized upon motion of the handwheel control in either direction of push-pull operation to open the solenoid valve and open the fixed altitude chamber to the atmosphere.

Hovering operation of the contact sets VR1 and VR2 of the vertical rate control is obtained by suitable magnetic biasing of the pivoted arm 51b. To this end coils VR3 and VR4 of the electromagnet assemblies 69 and 70 are connected in series with contacts VR1 and VR2 respectively, the arrangement being such that closure of a contact by the diaphragm forces acting on arm 51b, for example, consider the engagement of movable contact 65 with contact VR2, energizes the corresponding coil, coil VR4, producing a magnetic bias on the arm 51b tending to open the contacts, producing a hovering contact motion in which the electromagnetic biases balance the mechanical biases on arm 51b. By this means average currents of magnitudes depending upon the operation of the contact assembly are caused to flow in the circuits connected therewith producing a control proportional to the vertical rate and position intelligences.

A further control of the magnets of the vertical rate system is afforded by the climb and dive potentiometer CDP. This potentiometer forms a bridge circuit with coils CDP1 and CDP2 of magnets 69 and 70, the bridge being energized across the positive and negative (+), (−) conductors. The movable tap of potentiometer CDP is actuated by push-pull motion of the handwheel control and is connected between the coils CDP1 and CDP2 thereby unbalancing the bridge circuit and the coil currents upon movement thereof from neutral or bridge balance position. This control selectively biases arm 51b closing the selected contact set VR1 or VR2 and biasing the pitch rate gyroscope correspondingly. The gyroscope output actuates the elevator control to initiate the rate of dive or climb indicated by push or pull handwheel motion. Upon the occurrence of a vertical rate of the aircraft the diaphragm assembly of the vertical rate device biases the arm 51b in opposition to the magnetic bias acting thereon. In a short interval the rate of descent or ascent of the craft corresponds to that asked for at the handwheel control and the vertical rate device tends to maintain this condition.

Coils TRP1 and TRP2 of the vertical rate magnets 69 and 70 are provided primarily as trimmers to compensate for off center conditions. They are arranged in a bridge circuit with the tapped portions of trim potentiometer TRP energized across the power supply.

Coil sets VR5 and VR6 of the pitch rate gyroscope magnet system are respectively connected in series with movable contact 65 and contact VR1 and movable contact 65 and contact VR2, both series circuits extending across the power supply. Resistors R11 and R12 in the respective circuits for coils VR5 and VR6 provide means for controlling the sensitivity. Alternatively or in addition thereto the size of the orifice 52 may be selected to effect the desired sensitivity.

As previously noted the pitch potentiometer which is actuated by push-pull motion of the handwheel control controls the biasing effect of coils PP1 and PP2 upon the pitch rate gyroscope. Thus the pitch rate gyroscope is biased both by the vertical rate control stimulus originating at potentiometer CDP and the stimulus of poteniometer PP upon push-pull motion of the handwheel control. There are several ways of setting up this control, one being to proportion the control between the vertical rate control and the pitch potentiometer so that each effects the required bias over the entire range of control. However, this presents numerous problems in the way of selecting proper circuit constants and ascertaining the control required of each device. It is more convenient and, therefore, preferred, to adjust the distribution of control so that the vertical rate signal predominates over the operating range. Thus the ultimate rate of ascent or descent will be determined primarily by the control stimuli of the vertical rate control when it reaches equilibrium for the set in magnetic bias initiated at the climb and dive potentiometer CDP.

The operation of the system as a whole is substantially as follows. As a rule control of the aircraft during take-off is done under the manual control of the pilot. Once the plane is flying at the proper altitude on the selected course, the control is switched over to the auto pilot for fixed course control. In accomplishing this the gyroscopes are brought up to operating speed after which the source voltage may be applied and switches S1, S2 and S3 are closed to connect up the drives for the potentiometers RP, AP and EP, and the respective control surfaces. Brake B remains deenergized and released, however, until switch S4 is closed, the coil circuit therefor being broken through the right-hand blade, as viewed, of S4. Thus at this instant the rotor winding circuit for the synchro unit S is closed through the contacts B1 and the rotor position is synchronized with the voltage pattern of the stator winding thereof transmitted from the flux valve to the mentioned stator winding through the intermediate system elements, which properly orients the rotor for zero voltage output for the selected course. Closure of switch S4 energizes the coil of brake B applying the brake to lock the rotor and removing the shunt circuit on the rotor winding of unit S at which time a rotor signal voltage may be applied across the input to the amplifier.

The system now functions to maintain the aircraft on the selected course and to this end velocities of motion about any of the three control axes are instantly detected by the gyroscopes. Yawing velocities produce output torques at the turn gyroscope in directions which produce servo-mechanism operation to apply the rudder so as to produce opposite yaw velocities. During this interval the velocity feed-back voltage and the rudder potentiometer voltage produce electromagnetic biasing torques at the gyroscopes which oppose the precessional torque. The hovering contact condition which results produces an average current in the field of the rudder generator causing rudder movement at a predetermined rate which is a function of the velocity disturbance about the yaw axis. As rudder movement increases the electromagnetic bias increases, the velocity disturbance decreases and the gyro output torque decreases reducing the output current. At equilibrium the electromagnetic bias opposes and balances the gyro torque output at which point the motor stops and just sufficient current is circulated to maintain the required torque of the motor. At this point the velocity feed-back voltage is zero since the bridge circuit of the motor generator system is balanced. The rudder correction is now maintained for that small interval of time necessary to check the velocity disturbance at which time the gyroscopic response drops to zero with the velocity disturbance and the overbalancing electromagnetic bias produces a reversal of the servo-mechanism causing reverse rudder movement to neutral position. The function of the system in the reverse direction is essentially the same.

Cumulative errors in course are detected by the direction indicator and the error signal voltage applied to the input of the amplifier unbalances the currents circulating in coils CU1 and CU2. The unbalance torque about the output or precession axis of the turn gyroscope influences operation of the servo-mechanism for the rudder in a direction to correct the course error. While the course correction illustrated is continuous, it may of course be applied only at intervals to correct the slight cumulative course error.

Operation of the turn gyroscope produces voltages across the bank voltage potentiometer BVP which are applied to coils BV1 and BV2 of the bank gyroscope electromagnet system. Thus upon application of the rudder to check velocities of movement about the turn axis the bank gyroscope is controlled to produced aileron servo-mechanism operation in a direction to apply the ailerons in correspondence with the rudder position or direction of movement. This introduces a velocity about the roll axis which is detected by the roll gyroscope which produces an output torque opposing the bank voltage bias and the velocity feed-back voltage of the aileron servo system which now supplements the bank voltage signal. As the ailerons are displaced another electromagnetic bias appears which aids the bank voltage and velocity feedback bias. This bias is the result of operation of the aileron potentiometer AP which controls the excitation of coils AP1 and AP2. Equilibrium of the ailerons results when the potentiometer AP is suitably displaced to balance the magnetic torques against the gyroscopic and pendulous torques of the bank gyroscope. When equilibrium in the bank angle is reached the pendulous response of the bank gyroscope produces torques about the output axis thereof tending to center the bank gyroscope and return the ailerons to streamlined position.

Operation of the bank gyroscope produces a voltage across the skid voltage potentiometer SVP which is applied in series with the velocity feed-back voltage of the rudder servo system to the coils SV1 and SV2 of the turn gyroscope electromagnet system. This voltage tends to hold back or suppress rudder application and since the skid voltage diminishes with accumulated bank angle premature rudder application is minimized. Depending upon conditions the skid voltage may or may not be needed.

Turns may be executed by the simple expedient of rotating handwheel HW displacing the movable taps of both potentiometers TP and UEP to correspondingly control the biasing effects of the pair of coils TP1, TP2 and coil UEP1. The magnetic torques thus produced cause operation of the pitch and turn gyroscopes in a suitable direction to effect, for example, right rudder and up-elevator corresponding in amount to the right rudder application. At the same time the ailerons are applied for right bank because of the interconnection of the turn and bank gyroscope electromagnet controls. The gyroscope torques oppose the electromagnetic biases as previously described producing the hovering contact condition and average excitation currents for the elevator, aileron and rudder generator fields. Switch S5 is opened by the cam driven by the handwheel and deenergizes the brake B. Simultaneously therewith the rotor of the synchro unit is unlocked. Thus the rotor circuit is closed and the synchro unit functions as a repeater of the changing course of the aircraft in the turn.

Climbs and dives are executed by push-pull motion of handwheel control HW, this simultaneously operates both the climb and dive potentiometer CDP and the pitch potentiometer PP. Movement of the tap of potentiometer CDP unbalances the currents of coils CDP1 and CDP2 closing one of the contact sets of the vertical rate control. Accordingly one of the coil sets VR5 or VR6 is energized producing a magnetic bias about the output axis of the pitch gyroscope closing one or the other of contact sets PC1 or PC2 to correspondingly control the elevator servo system and apply the elevators in the direction indicated by the climb and dive potentiometers.

Simultaneously the pitch potentiometer produces a control of coils PP1 and PP2 augmenting the control of the vertical rate system on the pitch rate gyroscope. Together the two stimuli produce an elevator deflection resulting in a dive or a climb as indicated by the motion of the handwheel control.

When the handwheel is pushed or pulled switch S6 is opened deenergizing the coil SV1 of the solenoid valve controlling the valve opening into the fixed altitude chamber formed by the enclosure 60. This switch operation is preferably so set that contact disengagement occurs upon slight motion of the handwheel in each direction from neutral position so that opening of the fixed altitude chamber is assured for any set in rate of dive or climb.

During normal stabilizing operation or during periods of making coordinated turns the vertical rate control system functions to maintain the aircraft at a relatively constant altitude of flight with a minimum of vertical motion. For instance, should a change in altitude occur resulting in a vertical rate of motion of the craft above a given minimum value defined by the threshold of response of the vertical rate chamber, the pitch rate gyroscope is immediately biased by the vertical rate control in a direction to apply the elevators to check the pitch velocity. This it will be appreciated is in addition to the control afforded by the pitch velocity sense of the pitch rate gyroscope. Should the vertical rate of the craft be below the threshold of response of the vertical rate chamber, the resulting displacement in altitude is detected by the fixed altitude chamber which biases the movable arm 51b and initiates an elevator setting tending to return the craft to its initial altitude of flight. Under still other conditions both the fixed altitude and vertical rate chambers may simultaneously influence the elevator control.

It will be understood that vertical rates in turns are similarly detected and control stimuli introduced to check the unwanted motion.

As in the case of the course control unit the stabilizing influence of the vertical rate system may be made small so that appreciable corrections in flight altitude may not occur. However, this is a matter of operational choice which may be adapted to suit specific conditions.

Since the elevator control afforded by the vertical rate system recognizes a rate of change of altitude and corrects the flight altitude to check this error, actual vertical excursions are of a minor nature. The rate of change of air pressure is considered a better reference for altitude control than is a change in angle of attack afforded for instance by a pendulous member as previously described. A pendulum or gyro vertical depends upon a change in the angle of attack of the craft to indicate a vertical rate, but if the thrust or loading of the aircraft is changed, or a turn is negotiated, the angle of attack may be changed without causing a rate of motion in the vertical plane, although a pendulum or gyro vertical would indicate a change in angle of attack unless retrimmed. A pendulum, gyro vertical, or other type of vertical reference when controlling the pitch attitude will cause the aircraft to assume a particular angle of attack which may or may not result in zero vertical rate, depending upon the conditions of flight at the time, whereas the vertical rate system herein disclosed will cause the aircraft to assume whatever attitude is necessary to maintain constant altitude or, if desired, any particular rate of climb or dive within the operating range of the craft.

Since the vertical rate device 50 is a rate sensing control it will not maintain constant altitude with a high degree of accuracy and the provision of a fixed altitude reference afforded by device 60 may be necessary in some instances. However, in instances where minor excursions in altitude are not objectionable the device 60 may be eliminated.

The foregoing disclosure and the showings made in the drawings are merely illustrative of the principles of this invention and are not to be considered in a limiting sense. The only limitations are to be determined from the scope of the appended claims.

We claim as our invention:

1. Apparatus responsive to a rate of change of pressure of a fluid medium comprising, in combination, means forming a chamber having an opening therein, flexible diaphragm means sealing said opening, means forming an orifice communicating with said chamber affording a restricted passage for fluid to and from said chamber, an electrical coil, a core disposed with respect to said coil to be linked by the magnetic flux thereof and having a portion thereof extending beyond the region of said coil, an armature member, means movably mounting said armature member adjacent said portion of said core for motion towards and away from said electrical coil forming an airgap of substantially constant magnetic characteristic between the core and the armature member whether the armature member is moving or stationary, variable resistance means controlled by said armature member, the resistance of said variable resistance means being decreased upon motion of said armature member away from said electrical coil and being increased upon motion of said armature member towards said electrical coil, means connecting said armature member with said flexible diaphragm means to bias said armature member away from said electrical coil, and circuit means connecting said variable resistance means with said electrical coil to energize said electrical coil.

2. Apparatus as set forth in claim 1 in which said variable resistance means comprises a stationary contact and a movable contact, and means connecting said movable contact with said armature member to be moved thereby to positions engaging and disengaging said stationary contact.

3. Apparatus responsive to a rate of change of pressure of a fluid medium comprising, in combination, a fluid tight casing having an opening therein, flexible diaphragm means sealing said opening, means forming an orifice through said casing affording a restricted passage for fluid to and from the interior of said casing, a pair of core members each having one extremity confronting an extremity of the other forming an airgap therebetween, a coil disposed about the remote extremities of each core member so that the confronting extremities of the core members project beyond the coils, an armature member disposed adjacent said core members to straddle said airgap, means connecting said armature member with said flexible diaphragm means to be actuated thereby along said core members adjacent said airgap, and means responsive to movement of said armature member for selectively energizing said coils to magnetically bias said armature member in a direction opposite to the motion thereof due to said flexible diaphragm means.

4. Apparatus responsive to a rate of change of pressure of a fluid medium comprising, in combination, a fluid tight casing having an opening therein, flexible diaphragm means sealing said opening, means forming an orifice through said casing affording a restricted passage for fluid to and from the interior of said casing, a pair of core members each having one extremity confronting an extremity of the other forming an airgap therebetween, a coil disposed about the remote extremities of each core member so that the confronting extremities of the core members project beyond the coils, an armature member disposed adjacent said core members to straddle said airgap, means connecting said armature member with said flexible diaphragm means to be actuated thereby along said core members adjacent said airgap, a pair of spaced stationary contacts, a movable contact disposed between said stationary contacts, means connecting the movable contact with said armature member to be moved thereby to selectively engage said stationary contact, and circuit means connecting each stationary contact and the movable contact in series with one of the coils so that each coil has a contact in series therewith and the magnetic effects of a coil when energized biases said armature in a direction to separate the movable contact from the stationary contact with which it is engaged.

5. Apparatus responsive to a rate of change of pressure of a fluid medium comprising, in combination, a fluid tight casing having an opening therein, flexible diaphragm means sealing said opening, means forming an orifice through said casing affording a restricted passage for fluid to and from the interior of said casing, a pair of cylindrical core members each having one extremity confronting an extremity of the other forming an airgap therebetween, a coil disposed about the remote extremity of each core member so that the confronting extremities of the core members project beyond the coils, an armature member of annular form encompassing said core members at said airgap and being of sufficient axial length to straddle said airgap throughout the range of armature movement, means connecting said armature member with said flexible diaphragm means to be moved along said core members, and circuit means selectively responsive to movement of said armature member in each of the two directions of motion for selectively energizing the coils on said cores to produce magnetic biases on said armature member in opposition to the biases thereon due to said flexible diaphragm means.

6. Apparatus responsive to a rate of change of pressure of a fluid medium comprising, in combination, a fluid tight casing having an opening therein, flexible diaphram means sealing said opening, means forming an orifice through said casing affording a restricted passage for fluid to and from the interior of said casing, a pair of cylindrical core members each having one extremity confronting an extremity of the other forming an airgap therebetween, a coil disposed about the remote extremity of each core member so that the confronting extremities of the core members project beyond the coils, an armature member of annular form encompassing said core members at said airgap and being of sufficient axial length to straddle said airgap throughout the range of armature movement, means connecting said armature member with said flexible diaphragm means, to be moved along said core members, a pair of spaced stationary contacts, a movable contact disposed between the stationary contacts, means connecting the movable contact with the armature member to be moved thereby to selectively engage the stationary contacts, circuit means connecting the movable contact and one stationary contact in series with one coil to energize the coil upon engagement of the movable contact with said one stationary contact and produce a magnetic force on the armature tending to disengage the movable contact and said one stationary contact, and circuit means connecting the movable contact and the remaining stationary contact in series with the remaining coil to energize the said remaining coil upon engagement of the movable contact with said remaining stationary contact producing magnetic forces on said armature member tending to disengage the movable contact and said remaining stationary contact.

7. Fluid pressure responsive apparatus comprising, in combination, a first fluid tight casing having an opening therein, flexible diaphragm means sealing said opening, means providing an orifice through said casing affording a restricted passage for fluid to and from the interior of said casing, a second fluid tight casing having an opening therein, flexible diaphragm means sealing the opening of said second fluid tight casing, means mechanically interconnecting the flexible diaphragm means to combine the forces thereof resulting from fluid pressure changes, current control means, a movable member actuated by said flexible diaphragm means for controlling said current control means, and electromagnetic means responsive to said current control means for biasing said movable member in opposite to the actuation thereof by said flexible diaphragm means.

8. Apparatus responsive to a physical quantity comprising, in combination, a movable member, means responsive to a rate of change of said physical quantity for biasing said movable member in one direction, means responsive to a change in said physical quantity for biasing said movable member in said one direction, a pair of cylindrical core members each having one extremity confronting an extremity of the other forming an airgap therebetween, a coil disposed about the remote extremity of each core member so that the confronting extremities of the core members project beyond the coils, an armature member of annular form encompassing said core members at said airgap, means connecting said armature member with said movable member to be moved thereby along said core members, and circuit means responsive to movement of said movable member for energizing the coil on each core to produce magnetic biases on said armature member in opposition to the bias thereon due to said movable member.

9. Apparatus responsive to a physical quantity comprising, in combination, a movable member, first means responsive to a rate of change of said physical quantity for biasing said movable member in one direction, second means responsive to a change in said physical quantity for biasing said movable member in said one direction, contact means actuated to closed position by said movable member due to the bias thereon of said first and second means, and electromagnetic means connected with said contact means to be energized upon closure of said contact means for biasing said movable member in a direction to open said contact means.

10. In a control for a craft operable in a fluid medium and having elevation control means for effecting motion of the craft about the pitch axis thereof, the combination of, a rate gyroscope disposed on said craft to precess about a single output axis thereof in response to the velocity of motion of said craft about the pitch axis thereof for controlling said elevation control means, and means responsive to a rate of change of pressure of said fluid medium for controlling said rate gyroscope about said single output axis.

11. In a control for a craft operable in a fluid medium and having elevation control means for effecting motion of the craft about the pitch axis thereof, the combination of, gyroscope means responsive to the velocity of motion of said craft about the pitch axis thereof for controlling said elevation control means, means responsive to a rate of change of pressure of said fluid medium for producing a control quantity, means responsive to a change in pressure of said fluid medium for producing a control quantity, means for combining said control quantities, and means responsive to said combined control quantities for controlling said gyroscope means.

12. In a control for a craft operable in a fluid medium and having elevation control means for effecting motion of the craft about the pitch axis thereof, the combination of, a rate gyroscope disposed on said craft to respond to the velocity of motion thereof about said pitch axis, control means responsive to the rate gyroscope for operating said elevation control means, a movable member, pressure sensitive means responsive to a rate of change of pressure of said fluid medium for biasing said movable member, electromagnetic means responsive to movement of said movable member for biasing said movable member in opposition to the bias thereof due to said pressure sensitive means, and means responsive to movement of said movable member for controlling said rate gyroscope.

13. In a control for a craft operable in a fluid medium and having elevation control means for effecting motion of the craft about the pitch axis thereof, the combination of, a rate gyroscope disposed on said craft to respond to the velocity of motion thereof about said pitch axis, control means responsive to the rate gyroscope for operating said elevation control means, a movable member, pressure sensitive means responsive to a rate of change of pressure of said fluid medium for biasing said movable member, electromagnetic means responsive to movement of said movable member for biasing said movable member in opposition to the bias thereof due to said pressure sensitive means, means responsive to a change in pressure of said fluid medium for biasing said movable member, and means responsive to movement of said movable member for controlling said rate gyroscope.

14. In a control for a craft operable in a fluid medium and having elevation control means for effecting motion of the craft about the pitch axis thereof, the combination of, a rate gyroscope disposed on said craft to respond to the velocity of motion thereof about said pitch axis, control means responsive to the rate gyroscope for operating said elevation control means, a movable member, pressure sensitive means responsive to a rate of change of pressure of said fluid medium for biasing said movable member, electromagnetic means responsive to movement of said movable member for biasing said movable member in opposition to the bias thereof due to said pressure sensitive means, means responsive to movement of said movable member for controlling said rate gyroscope, piloting means, and circuit means responsive to said piloting means for energizing said electromagnetic means.

15. In a control for a craft operable in a fluid medium and having elevation control means, the combination of, servo means for actuating said elevation control means, a movable member, pressure sensitive means responsive to a rate of change of fluid pressure for biasing said movable member, electromagnetic means responsive to movement of said movable member for biasing said movable member in opposition to the bias thereof due to said pressure sensitive means, piloting means, circuit means responsive to said piloting means for controlling said electromagnetic means, and means responsive to movement of said movable member for controlling said servo means.

16. In a control for a craft operable in a fluid medium and having elevation control means, the combination of, servo means for actuating said elevation control means, a movable member, first means responsive to a rate of change of fluid pressure for biasing said movable member, second means responsive to a change in fluid pressure for biasing said movable member, electromagnetic means responsive to movement of said movable member for biasing said movable member in opposition to the bias thereof due to said first and said second means, piloting means, means responsive to said piloting means for controlling said electromagnetic means, and means responsive to movement of said movable member for controlling said servo means.

17. In a control for a craft operable in a fluid medium and having elevation control means for controlling motion of the craft about the pitch axis thereof, the combination of, control means for actuating said elevation control means, a rate gyroscope disposed on said craft to respond to the velocity of motion of said craft about said pitch axis for controlling said control means, electromagnetic means for biasing said rate gyroscope to control the response thereto to said velocity of motion, and means responsive to the rate of change of pressure of the fluid medium in which said craft operates for energizing said electromagnetic means.

18. In a control for a craft operable in a fluid medium and having elevation control means for controlling motion of the craft about the pitch axis thereof, the combination of, control means for actuating said elevation control means, a rate gyroscope disposed on said craft to respond to the velocity of motion of said craft about said pitch axis for controlling said control means, electromagnetic means for biasing said rate gyroscope to control the response thereof to said velocity of motion, and means responsive to a change in pressure of the fluid medium in which said craft operates for energizing said electromagnetic means.

19. In a control for a craft operable in a fluid medium and having elevation control means for controlling motion of the craft about the pitch axis thereof, the combination of, control means for actuating said elevation control means, a rate gyroscope disposed on said craft to respond to the velocity of motion of said craft about said pitch axis for controlling said control means, electromagnetic means for biasing said rate gyroscope to control the response thereto to said velocity of motion, means responsive to a rate of change of pressure of the fluid medium in which said craft operates for producing a control quantity, means responsive to a change in pressure of said fluid medium for producing a control quantity, and means for combining said control quantities and producing an electrical quantity for energizing said electromagnetic means.

20. In a control for a craft operable in a fluid medium and having elevation control means, the combination of, control means for actuating said elevation control means, a first casing having an opening therein, flexible diaphragm means sealing the opening in said first casing forming a fluid tight chamber therewithin, means forming an orifice through said casing communicating with said chamber, a second casing having an opening therein, flexible diaphragm means sealing the opening in said second casing, valve means forming a passage for fluid to and from said second casing, a movable member responsive to movement of said flexible diaphragm means associated with said first and said second casings, piloting means, means responsive to said piloting means for controlling said movable member, means responsive to said piloting means for controlling said valve means, means responsive to said movable member for controlling said control means and means responsive to said piloting means for controlling said control means.

21. In a control for a craft operable in space, the combination of, turn control means, roll control means and pitch control means, pressure sensitive means for controlling said pitch control means, piloting means having two degrees of freedom, means responsive to motion of said piloting means in one of said two degrees of freedom for controlling said pressure sensitive means, means responsive to motion of said piloting means in the second of said two degrees of freedom for controlling said turn control means, and means responsive to motion of said piloting means in said second of said two degrees of freedom for controlling said pitch control means.

22. In a control for a craft operable in space, the combination of, turn control means, roll control means and pitch control means, pressure sensitive means for controlling said pitch control means, piloting means having two degrees of freedom, means responsive to motion of said piloting means in one of said two degrees of freedom for controlling said pressure sensitive means, means responsive to motion of said piloting means in said one of said two degrees of freedom for controlling said pitch control means, means responsive to motion of said piloting means in the second of said two degrees of freedom for controlling said turn control means, and means responsive to motion of said piloting means in said second of said two degrees of freedom for controlling said pitch control means.

23. In a control for a craft operable in space, the combination of, turn control means, roll control means and pitch control means, pressure sensitive means including a flexible diaphragm assembly forming a chamber, means forming an orifice communicating with said chamber affording a passage for air to and from said chamber, a movable member responsive to motion of said flexible diaphragm assembly, means responsive to motion of said movable member for controlling said pitch control means, piloting means having two degrees of freedom, means responsive to motion of said piloting means in one of said two degrees of freedom for controlling said movable member, means responsive to motion of said piloting means in the second of said two degrees of freedom for controlling said turn control means, and means responsive to said piloting means in said second of said two degrees of freedom for controlling said pitch control means.

24. In a control for a craft operable in space, the combination of, turn control means, roll control means and pitch control means, pressure sensitive means including a flexible diaphragm assembly forming a chamber, means forming an orifice communicating with said chamber affording a passage for air to and from said chamber, a movable member responsive to motion of said flexible diaphragm assembly, means responsive to motion of said movable member for controlling said pitch control means, piloting means having two degrees of freedom, means responsive to motion of said piloting means in one of said two degrees of freedom for controlling said movable member, means responsive to motion of said piloting means in said one of said two degrees of freedom for controlling said pitch control means, means responsive to motion of said piloting means in the second of said two degrees of freedom for controlling said turn control means, and means responsive to said piloting means in said second of said two degrees of freedom for controlling said pitch control means.

25. In a control for an aircraft, the combination of, turn velocity means responsive to turning velocity of said aircraft for controlling turning movement of said aircraft, roll velocity means responsive to rolling velocity of said aircraft for controlling rolling movement of said aircraft, pitch velocity means responsive to pitching velocity of said aircraft for controlling pitching movement of said aircraft, pressure sensitive means for controlling said pitch velocity means, course control means for controlling said turn velocity means, piloting means having two degrees of freedom, means responsive to movement of said piloting means in one of said two degrees of freedom for controlling said pressure sensitive means, means responsive to movement of said piloting means in the second of said two degrees of freedom for controlling said turn velocity means, means responsive to movement of said piloting means in said second of said two degrees of freedom for controlling said course control means, and means responsive to movement of said piloting means in said second of said two degrees of freedom for controlling said pitch velocity means.

26. In a control for an aircraft, the combination of, turn velocity means responsive to turning velocity of said aircraft for controlling turning movement of said aircraft, roll velocity means responsive to rolling velocity of said aircraft for controlling rolling movement of said aircraft, pitch velocity means responsive to pitching velocity of said aircraft for controlling pitching movement of said aircraft, pressure sensitive means for controlling said pitch velocity means, course control means for controlling said turn velocity means, piloting means having two degrees of freedom, means responsive to movement of said piloting means in one of said two degrees of freedom for controlling said pressure sensitive means, means responsive to movement of said piloting means in said one of said two degrees of freedom for controlling said pitch velocity means, means responsive to movement of said piloting means in the second of said two degrees of freedom for controlling said turn velocity means, means responsive to movement of said piloting means in said second of said two degrees of freedom for controlling said course control means, and means responsive to movement of said piloting means in said second of said two degrees of freedom for controlling said pitch velocity means.

27. In a control for an aircraft, the combination of, turn velocity means responsive to turning velocity of said aircraft for controlling turning movement of said aircraft, roll velocity means responsive to rolling velocity of said aircraft for controlling rolling movement of said aircraft, pitch velocity means responsive to pitching velocity of said aircraft for controlling pitching movement of said aircraft, pressure sensitive means including a flexible diaphragm assembly forming a chamber, means forming an orifice communicating with said chamber affording a passage for air to and from said chamber, a movable member responsive to movement of said flexible diaphragm assembly, means responsive to movement of said movable member for controlling said pitch velocity means, piloting means having two degrees of freedom, means responsive to movement of said piloting means in one of said two degrees of freedom for controlling said movable member, means responsive to movement of said piloting means in the second of said two degrees of freedom for controlling said turn velocity means, means responsive to movement of said piloting means in said second of said two degrees of freedom for controlling said course control means, and means responsive to movement of said piloting means in said second of said two degrees of freedom for controlling said pitch velocity means.

28. In a control for an aircraft, the combination of, turn velocity means responsive to turning velocity of said aircraft for controlling turning movement of said aircraft, roll velocity means responsive to rolling velocity of said aircraft for controlling rolling movement of said aircraft, pitch velocity means responsive to pitching velocity of said aircraft for controlling pitching movement of said aircraft, pressure sensitive means including a flexible diaphragm assembly forming a chamber, means forming an orifice communicating with said chamber affording a passage for air to and from said chamber, a movable member responsive to movement of said flexible diaphragm assembly, means responsive to movement of said movable member for controlling said pitch velocity means, piloting means having two degrees of freedom, means responsive to movement of said piloting means in one of said two degrees of freedom for controlling said movable member, means responsive to a movement of said piloting means in said one of said two degrees of freedom for controlling said pitch velocity means, means responsive to movement of said piloting means in the second of said two degrees of freedom for controlling said turn velocity means, means responsive to movement of said piloting means in said second of said two degrees of freedom for controlling said course control means, and means responsive to movement of said piloting means in said second of said two degrees of freedom for controlling said pitch velocity means.

29. In a control for an aircraft, the combination of, turn velocity means responsive to turning velocity of said aircraft for controlling turning movement of said aircraft, roll velocity means responsive to rolling velocity of said aircraft for controlling rolling movement of said aircraft, pitch velocity means responsive to pitching velocity of said aircraft for controlling pitching movement of said aircraft, pressure sensitive means including a flexible diaphragm assembly forming a chamber, valve means communicating with said chamber forming a passage for air to and from said chamber, a movable member responsive to movement of said diaphragm assembly, course control means for controlling said turn velocity means, means responsive to movement of said movable member for controlling said pitch velocity means, piloting means having two degrees of freedom, means responsive to movement of said piloting means in one of said two degrees of freedom for controlling said valve means, means responsive to movement of said piloting means in said one of said two degrees of freedom for controlling said movable member, means responsive to movement of said piloting means in the second of said two degrees of freedom for controlling said turn velocity means, means responsive to movement of said piloting means in said second of said two degrees of freedom for controlling said course control means, and means responsive to movement of said piloting means in said second of said two degrees of freedom for controlling said pitch velocity means.

30. In a control for an aircraft, the combination of, turn velocity means responsive to turning velocity of said aircraft for controlling turning movement of said aircraft, roll velocity means responsive to rolling velocity of said aircraft for controlling rolling movement of said aircraft, pitch velocity means responsive to pitching velocity of said aircraft for controlling pitching movement of said aircraft, pressure sensitive means including a flexible diaphragm assembly forming a chamber, valve means communicating with said chamber forming a passage for air to and from said chamber, a movable member responsive to movement of said diaphragm assembly, course control means for controlling said turn velocity means, means responsive to movement of said movable member for controlling said pitch velocity means, piloting means having two degrees of freedom, means responsive to movement of said piloting means in one of said two degrees of freedom for controlling said valve means, means responsive to movement of said piloting means in said one of said two degrees of freedom for controlling said movable member, means responsive to movement of said piloting means in said one of said two degrees of freedom for controlling said pitch velocity means, means responsive to movement of said piloting means in the second of said two degrees of freedom for controlling said turn velocity means, means responsive to movement of said piloting means in said second of said two degrees of freedom for controlling said course control means, and means responsive to movement of said piloting means in said second of said two degrees of freedom for controlling said pitch velocity means.

31. In a control for an aircraft, the combination of, turn velocity means responsive to turning velocity of said aircraft for controlling turning movement of said aircraft, roll velocity means responsive to rolling velocity of said aircraft for controlling rolling movement of said aircraft, pitch velocity means responsive to pitching velocity of said aircraft for controlling pitching movement of said aircraft, first pressure sensitive means including a flexible diaphragm assembly forming a chamber, means forming an orifice communicating with said chamber affording a restricted passage for air to and from said chamber, second pressure sensitive means including a flexible diaphragm assembly forming a chamber, valve means communicating with said chamber forming a passage for air to said chamber which may be opened or closed, a movable member responsive to movement of both of said flexible diaphragm assemblies, means responsive to movement of said movable member for controlling said pitch velocity means, course control means for controlling said turn velocity means, piloting means having two degrees of freedom, means responsive to movement of said piloting means in one of said two degrees of freedom for controlling said movable member, means responsive to movement of said piloting means in said one of said two degrees of freedom for controlling said valve means, means responsive to movement of said piloting means in said one of said two degrees of freedom for controlling said pitch velocity means, means responsive to movement of said piloting means in the second of said two degrees of freedom for controlling said turn velocity means, means responsive to movement of said piloting means in said second of said two degrees of freedom for controlling said turn velocity means, means responsive to movement of said piloting means in said second of said two degrees of freedom for controlling said course control means, and means responsive to movement of said piloting means in said second of said two degrees of freedom for controlling said pitch velocity means.

32. Apparatus responsive to a physical quantity comprising, in combination, a movable member, first means responsive to a rate of change of the physical quantity and mechanically connected to said movable member for biasing said movable member in one direction, second means responsive to a change in the physical quantity and mechanically connected to said movable member for biasing said movable member in said one direction, electromagnetic means associated with said movable member for biasing said movable member in a reverse direction upon energization of said electromagnetic means, current control means operated by said movable member, and an electric circuit electrically connecting said current control means to said electromagnetic means to increasingly energize said electromagnetic means upon movement of said movable member in said one direction and to decreasingly energize said electromagnetic means upon movement of said movable member in said reverse direction.

33. In an apparatus responsive to a rate of change of pressure of a gas in which it is immersed, the combination of, a flexible casing having an orifice therein for the passage of gas to and from the interior of the casing, an electromagnetic device having an armature member connected to the flexible casing to be moved by deflection of said casing, current control means connected to said armature member to be actuated thereby, and an electrical circuit connecting said current control means to said electromagnetic device for energizing said electromagnetic device and producing a magnetic bias on said armature member to move said armature member in opposition to the deflection of said casing.

34. In a gas pressure sensitive apparatus adapted for immersion in a gaseous medium, the combination of, a flexible casing having an orifice therein for the passage of gas to and from the interior of the casing, a second flexible casing, valve means connected with said second flexible casing for opening and closing the second casing, said valve means being normally closed, an electromagnetic device having an armature member connected to each flexible casing to be moved in the same direction by deflection of each casing upon the occurrence of a change in gas pressure, current control means connected to said armature member to be actuated thereby, and an electrical circuit connecting said current control means to said electromagnetic device for energizing said electromagnetic device and producing a magnetic bias on said armature member in opposition to the bias of said casings.

35. In a control for a craft operable in a fluid medium and having elevation control means for effecting motion of said craft about the pitch axis thereof, the combination of, a rate gyroscope disposed on said craft to precess about a single output axis thereof in response to the velocity of motion of said craft about the pitch axis thereof, for controlling said elevation control means, means for producing a control quantity indicative of the rate of change of pressure of said fluid medium, and control means responsive to said control quantity for controlling said rate gyroscope about said single output axis.

References Cited in the file of this patent

UNITED STATES PATENTS

| Number | Name | Date |
|---|---|---|
| 1,418,335 | Sperry | June 6, 1922 |
| 1,966,170 | Greene | July 10, 1934 |
| 1,997,412 | Fischel | Apr. 9, 1935 |
| 2,025,749 | Hubbard | Dec. 31, 1935 |
| 2,091,306 | Carlson | Aug. 31, 1937 |
| 2,100,706 | Wunsch | Nov. 30, 1937 |
| 2,113,436 | Williams | Apr. 5, 1938 |
| 2,137,974 | Fischel | Nov. 22, 1938 |
| 2,203,671 | Carlson | June 11, 1940 |
| 2,221,748 | Alkan | Nov. 19, 1940 |
| 2,315,501 | Crane et al. | Apr. 6, 1943 |
| 2,401,168 | Kronenberger | May 28, 1946 |
| 2,415,430 | Frische et al. | Feb. 11, 1947 |
| 2,474,618 | Divoll | June 28, 1949 |